June 1, 1965 H. C. WORD 3,186,036
COTTON CLEANING MACHINE
Filed March 26, 1962
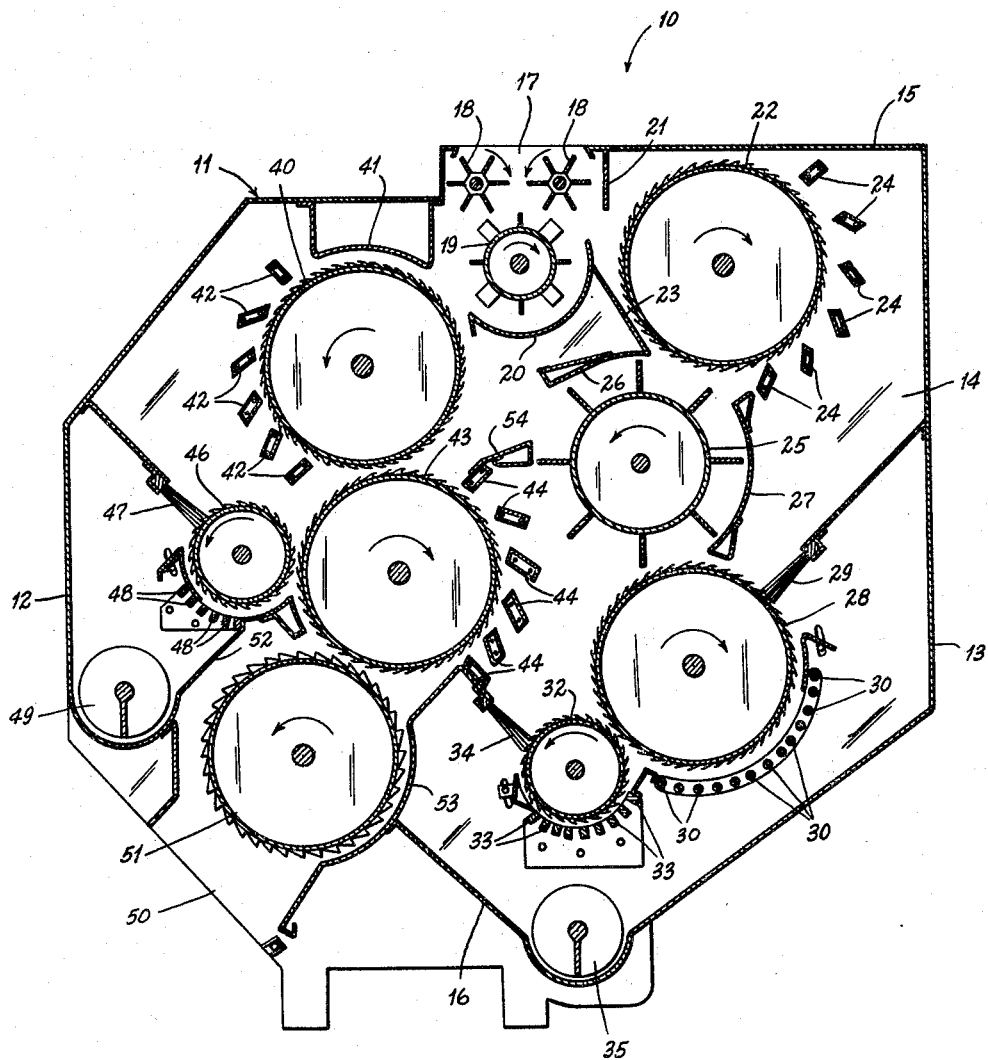
INVENTOR:
HARRY C. WORD,
BY Kingsland, Rogers, Ezell & Robbins
ATTORNEYS

United States Patent Office 3,186,036
Patented June 1, 1965

3,186,036
COTTON CLEANING MACHINE
Harry C. Word, Dallas, Tex., assignor to John E. Mitchell Company, Dallas, Tex., a corporation of Missouri
Filed Mar. 26, 1962, Ser. No. 182,453
10 Claims. (Cl. 19—203)

This application relates to a cotton cleaning machine and, more particularly, to a cotton cleaning machine that divides cotton and trash introduced into the machine into two streams, one stream having more trash and less cotton than the other stream; and the invention relates to a cotton cleaning machine that operates efficiently and at high speed, making it capable of continuously feeding cleaned cotton to modern, high-speed ginning machines.

This cotton cleaning machine has two separate cleaning sections that receive cotton and trash from a distributor roller and separate the trash from the cotton, and has means for bringing the streams of cotton from the two cleaning sections together for a final cleaning operation prior to discharge from a single cotton outlet. A special distributor roller for receiving cotton and trash and sending about one-third of the cotton and two-thirds of the trash toward one cleaning section and about two-thirds of the cotton and one-third of the trash toward the other cleaning section. The cleaning section which receives more trash and less cotton is designed with cleaner and reclaimer saw cylinders that have a high cleaning capacity, while the cleaning capacity of the other cleaning section need not be as great.

A principal object of this invention is to provide a cotton cleaning machine having two separate cleaning sections with means for dividing the cotton and trash into two streams directed toward the two cleaning sections, one of which streams has substantially more trash and substantially less cotton than the other stream. A collateral object is to provide a cotton cleaning machine having two cleaning sections, one of which is designed to clean very dirty cotton and the other of which is designed to clean cleaner cotton, with means for converging the streams of cleaned cotton from the two cleaning sections into a single stream for a final cleaning operation and discharge from the machine.

Another object of the invention is to provide a cotton cleaning machine that has a high cleaning capacity, with large saw cylinders for rapid cleaning.

The drawing is a side elevation view in medial section through the cotton cleaning machine.

The cleaning machine 10 has a housing 11 with left and right walls 12 and 13, end walls 14, a top wall 15 and a bottom wall 16. There is a cotton inlet 17 through the top wall 15.

A pair of feeder rollers 18 are mounted between the end walls 14 just below the inlet 17. The feeder rollers rotate slowly in opposite directions, as indicated by the arrows, to feed cotton between them into the housing. A distributor roller 19 is mounted below the feeder rollers and rotates in a clockwise direction at a high rate of speed (about 600–700 r.p.m.). Cotton carried around the under side of the distributor roller 19 is confined by a stationary arcuate baffle wall 20 which is spaced a short distance from the distributor roller. A vertical baffle wall 21 extends downwardly from the top 15 of the housing, but there is a space between the lower edge of the baffle wall 21 and the upper right edge of the curved baffle 20 through which cotton and trash slung from the distributor roller 19 can pass.

There are generally separate right and left cleaning sections within the housing, both served with cotton and trash by the distributor roller 19. The operations of these right and left sections are interrelated as will appear. The right section is described first and begins with a large (about eighteen inches in diameter) cleaning saw cylinder 22 rotatably supported between the end walls 14. The saw cylinder 22 is positioned opposite the opening between the baffles 20 and 21. It rotates in a clockwise direction at about 300 r.p.m. There is a sloping baffle wall 23 beneath the saw cylinder 22 so that little, if any, cotton can drop toward the baffle 23 without being impaled by the teeth of the saw cylinder. What cotton does fall against the baffle 23 bunches up between it and the saw cylinder 22 until the cotton is picked up by the saw cylinder 22. The right side of the cleaning saw cylinder 22 is surrounded by beater bars 24 which separate sticks, trash, earth and other foreign matter from the cotton in the known manner.

A doffer 25 which rotates much faster than the saw cylinder 22 is mounted below the saw cylinder. The doffer rotates in a counterclockwise direction at about 800 r.p.m. or more. On opposite sides of the doffer there are baffles 26 and 27 which are spaced apart to permit cotton to be doffed from the saw cylinder 22.

Adjacent the lower side of the doffer 25 is a large cleaner and reclaimer saw cylinder 28 which intercepts sticks, trash, earth, and other foreign matter and cotton dropped between the grid bars 24. The diameter of this saw cylinder may be the same as that of the saw cylinder 22 and it rotates in a clockwise direction at about 300 r.p.m. The sticks, trash, earth and foreign matter are expelled past a brush 29 at the side of the reclaimer saw cylinder and between beater bars 30 beneath the reclaimer saw cylinder, while the cotton is impaled by the teeth of the saw cylinder 28.

Another, smaller, reclaimer saw cylinder 32 is positioned below the left side of the saw cylinder 28. The saw cylinder 32 rotates in a counterclockwise direction, opposite to the direction of the saw cylinder 28, as shown by the arrows on the drawing. Also, the reclaimer saw cylinder 32 rotates at only about 150 r.p.m., or half the speed of the saw cylinder 28. A number of grid bars 33 are spaced opposite the lower side of the reclaimer saw cylinder 32 and a brush 34 is alongside a side of the saw cylinder 32 to discharge trash downwardly.

A conveyor screw 35 is below the reclaimer saw cylinders 28 and 32 to carry trash out of the housing.

Directing attention now to the left side of the housing and left cleaning section, there is another series of cleaning saw cylinders, starting near the top of the housing with a large cleaning saw cylinder 40. The upper side of the saw cylinder 40 is opposite the left side of the distributor roller 19 to receive cotton and trash slung toward it. The saw cylinder 40 is about 18 inches in diameter, like the saw cylinders 22 and 28, and rotates in a counterclockwise direction at about 150 to 200 r.p.m. A guard or baffle 41 presses the cotton onto the teeth of the saw cylinder 40 and directs that cotton and the sticks and trash which are with it toward a series of beater bars 42 which separate the sticks and trash from the cotton.

Another cleaning saw cylinder 43 is below the saw cylinder 40. The saw cylinder 43 is also about eighteen inches in diameter, but rotates in a clockwise direction at about twice the speed of the saw cylinder 40 and thereby acts also as a doffer for the saw cylinder 40.

A plurality of beater bars 44 are along the right side of the saw cylinder 43 to separate sticks and trash from the cotton impaled on the teeth of the saw cylinder 43.

Adjacent the left side of the cleaning saw cylinder 43 is a small reclaimer saw cylinder 46 that rotates in a counterclockwise direction at about 150 r.p.m. In this position, the reclaimer saw cylinder 46 is below the beater bar side of the cleaning saw cylinder 40 to intercept cotton dropped with trash from the cleaning saw cylinder 40.

There is a brush 47 to one side of the reclaimer saw cylinder 46 and grid bars 48 below the reclaimer saw cylinder 46 to discharge sticks and trash downwardly as is known in the art. Such sticks and trash are carried out of the machine by a screw conveyor 49. Since the cleaning saw cylinder 43 rotates at twice the speed of the reclaimer saw cylinder 46, it also acts as a doffing saw cylinder for the reclaimer saw cylinder 46.

At the lower left side of the housing is an outlet opening 50, and between the cleaning saw cylinder 43 and the outlet opening 50 there is a doffer 51 that rotates in a counterclockwise direction (opposite to the direction or rotation of the cleaning saw cylinder 43). The doffer 51 rotates at about 800 r.p.m. or more. The doffer 51 is a saw cylinder, but its teeth are straight and do not have the leading edges of conventional cleaning saw cylinders. Compare the teeth of the saw cylinder 51 with the teeth of the other saw cylinders shown in the drawing. The straight teeth on the doffer 51 allow the cotton to be slung off the doffer without producing wind so that the cotton discharges gently toward the outer and is not blown around. A cotton path on opposite sides of the doffer 51 is defined by baffle walls 52 and 53.

Returning now to the cleaning doffing saw cylinder 43, it can be seen in the drawing that this saw cylinder is positioned to one side and slightly below the doffer wheel 25 on the right cleaning section. This cleaning saw cylinder 43 is therefore in the path of cotton slung away from the doffer 25. There is a small baffle 54 that directs cotton from the doffer 25 onto the saw cylinder 43.

*Operation*

The design of this cotton cleaning machine creates a distribution of cotton and trash to two separate cleaning sections, such that a much greater cleaning efficiency is accomplished with an economical number of cleaning saw cylinders. The distribution begins with the distributor roller 19 below the inlet feeder rollers 18. In practice, this distributor roller 19, which rotates in a clockwise direction at about 600–700 r.p.m., receives all of the cotton and trash introduced into the machine but throws about two-thirds of the trash and only about one-third of the cotton to the right toward the cleaning saw cylinder 22. The remaining one-third of trash and about two-thirds of cotton are carried by the distributor roller 19 in confinement by the baffle wall 20 and are slung to the left toward the cleaning saw cylinder 40. It is believed that this unequal distribution of cotton and trash to the right and left saw cylinders 22 and 40 is caused by the difference in weight between the cotton and trash. The heavier sticks and trash are struck and propelled almost immediately upon impact with the fast moving blades of the doffer wheel 19, whereas the more yieldable, lightweight cotton gathers ahead of the doffer blades and is carried by the blades until it can fall away from them at the lower left side toward the cleaning saw cylinder 40.

The trash and cotton thrown to the right by the distributor roller 19 pass through the space between the baffles 20 and 21 and are picked up by the saw cylinder 22. The sticks and trash are separated from the cotton by the beater bars 24, but because there is so much trash, quite a lot of cotton escapes from the saw cylinder 22 with the trash. All of this trash and cotton fall downwardly toward the cleaner-reclaimer saw cylinder 28, which is large enough to be an effective cleaning saw cylinder. The sticks and trash drop between the grid bars 30 below the saw cylinder 28 while the cotton impaled on the teeth of the saw cylinder 28 is carried past the grid bars 30. This cotton is not removed by the reclaimer saw cylinder 32 because that saw cylinder rotates much slower than the saw cylinder 28.

Returning to the cleaning saw cylinder 22 and the cotton impaled on its teeth and not dropped with the trash between the beater bars 24, the retained cotton is doffed by the doffer 25, which throws the cotton to the left toward the cleaner-doffer saw cylinder 43. Any of this cotton which is not thrown across the top of the baffle 54 drops downwardly toward the reclaimer saw cylinder 32 where the trash is separated by the brush 34 and the grid bars 33. The faster moving cleaner-reclaimer saw cylinder 28 doffs the cotton from the reclaimer saw cylinder 32.

The doffer 25 also operates to doff cotton from the saw cylinder 28. This cotton mixes with the cotton doffed from the saw cylinder 22 and is thrown to the left toward the cleaner-doffer saw cylinder 43.

The cotton and trash which are thrown toward the left by the distributor roller 19 are intercepted by the cleaning saw cylinder 40. This cotton is much cleaner than the cotton which is delivered to the cleaning saw cylinder 22, and therefore, the sticks and trash separate more readily from the cotton, past the beater bars 42. Since less cotton is carried with this trash, only the conventional reclaimer saw cylinder 46 is needed, and it intercepts cotton while passing trash past the brush 47 and the grid bars 48.

The saw cylinder 43 operates as both a cleaning saw cylinder and as a doffing cylinder. As has already been mentioned, cotton doffed by the doffer 25 is thrown toward the saw cylinder 43. In addition, the saw cylinder 43 doffs cotton from the cleaning saw cylinder 40 and from the reclaimer saw cylinder 46. Therefore, all of the cotton eventually encounters the cleaning saw cylinder 43, but by that time, the cotton is fairly well cleaned. This last is true because the cotton delivered directly from the cleaning saw cylinder 22 to the doffer 25 is the cleanest of the cotton initially thrown to the right by the distributor roller 19, whereas the cotton from the saw cylinder 28 has been acted upon by both the saw cylinder 22 and the saw cylinder 28 and, although initially dirtier cotton, has been subjected to the additional cleaning operation. Finally, cotton doffed from the saw cylinder 40 and from the reclaimer cylinder 46 was cleaner to start with and can therefore be cleaned by the action of the saw cylinder 40 and the saw cylinder 43.

All of the cotton which is finally doffed onto the saw cylinder 43 or thrown against it by the doffer 25 is subjected to further cleaning by the saw cylinder 43 and the beater bars 44. Any cotton that escapes past the beater bars 44 is reclaimed by the reclaimer saw cylinder 32 and eventually returned to the saw cylinder 43 as is now apparent. The doffer 51 takes the cotton from the saw cylinder 43 and directs it to the outlet 50.

Various changes and modifications may be made within the process of this invention as will be readily apparent to those skilled in the art. Such changes and modifications are within the scope and teaching of this invention as defined by the claims appended thereto.

What is claimed is:

1. A cotton cleaning machine comprising a housing, separate cleaning stations within the housing each comprising at least one cleaning saw cylinder with means associated with each cleaning station to separate sticks and trash from cotton, an inlet into the housing for the introduction of cotton along with sticks and trash, and means to divide the cotton, sticks and trash into two streams each directed toward one of the cleaning stations, the last-named means comprising a high speed impeller for causing one stream to have a substantially greater amount of sticks and trash and a substantially lesser amount of cotton than the other stream.

2. A cotton cleaning machine comprising a housing, a cotton inlet into the housing, a high speed distributor roller near the inlet, feeder means between the inlet and the distributor roller for directing cotton and trash from the inlet to the distributor roller, a first cleaning saw cylinder on one side of the distributor roller, a second saw cylinder on another side of the distributor roller, the distributor roller having fast rotating blades to direct more trash to the first cleaning saw cylinder than to the second and more cotton to the second saw cylinder than to the first.

3. The cotton cleaning machine of claim 2 including an additional cleaning saw cylinder and means to deliver cotton to the additional saw cylinder from the first saw cylinder.

4. A cotton cleaning machine comprising a housing, an inlet to the housing for introducing cotton along with trash and the like into the housing, first and second cleaning saw cylinders within the housing, distributor roller means between the inlet and the cleaning saw cylinders for directing less than half the cotton and more than half the trash to the first cleaning saw cylinder and the rest of the cotton and trash to the second cleaning saw cylinder, an additional cleaning saw cylinder, means to deliver cotton from the first cleaning saw cylinder to the additional cleaning saw cylinder, a reclaimer saw cylinder below the second cleaning saw cylinder for intercepting cotton dropped with trash from the second cleaning saw cylinder, and two reclaimer saw cylinders below the first cleaning saw cylinder, one of the last two named reclaimer saw cylinders being positioned to intercept cotton dropped with trash from the additional cleaning saw cylinder and the other being positioned to intercept cotton dropped with trash from the first cleaning saw cylinder and to doff cotton from the said one reclaimer saw cylinder, the said other reclaimer saw cylinder also being sized to operate as a cleaning saw cylinder.

5. The cotton cleaning machine of claim 4 wherein the cleaning saw cylinders are substantially eighteen inches in diameter.

6. A cotton cleaning machine comprising a housing, an inlet through the upper side of the housing for the introduction of trashy cotton, an outlet from the housing for the discharge of cleaned cotton, distributor roller means adjacent the inlet, means for feeding the trashy cotton to the distributor roller means, the distributor roller means comprising fast rotating blades for impelling more than half the trash and less than half the cotton in one stream and for directing the rest of the trash and cotton in another stream, a first cleaning saw cylinder in the path of the first stream and a second cleaning saw cylinder in the path of the second stream, means for doffing cotton from the second saw cylinder, means for doffing cotton from the first saw cylinder and for directing the doffed cotton to the first named doffing means to combine the cotton into a single stream, and means for directing the single stream to the outlet.

7. The machine of claim 6 including a third cleaning saw cylinder in the path of trash and cotton dropped from the first saw cylinder, means to separate trash from cotton intercepted by the third saw cylinder, a reclaimer saw cylinder adjacent the third saw cylinder for intercepting cotton dropped from the first named doffing means, means to rotate the third saw cylinder faster than the reclaimed saw cylinder whereby the third saw cylinder also operates as a doffer for the reclaimer saw cylinder, the second named doffing means being positioned to doff cotton from the third saw cylinder.

8. The machine of claim 6 wherein the first named doffing means comprises a cleaning saw cylinder positioned next to the second saw cylinder and in the path of the single stream for cleaning all the cotton prior to discharge through the outlet.

9. A cotton cleaning machine comprising a housing, an inlet through the housing for the introduction of trashy cotton, an outlet from the housing for the discharge of cleaned cotton, a distributor roller adjacent the inlet, the distributor roller having blades in the path of all the trashy cotton for impelling more than half the cotton and less than half the trash in one stream and the remaining cotton and trash in another stream, a first cleaning saw cylinder in the path of the first stream and a second cleaning saw cylinder in the second stream, and means for directing the cleaned cotton to the outlet.

10. The cotton cleaning machine of claim 9 wherein the rotational speed of the distributor roller is about 600–700 r.p.m.

References Cited by the Examiner
UNITED STATES PATENTS

| | | | |
|---|---|---|---|
| 1,426,588 | 8/22 | Mitchell | 19—36 |
| 1,914,893 | 6/33 | Mitchell | 19—36 |
| 2,733,480 | 2/56 | Mitchell | 19—37 |
| 3,086,254 | 4/63 | Mitchell et al. | 19—203 |

DONALD W. PARKER, *Primary Examiner.*

RUSSELL C. MADER, *Examiner.*